Patented June 12, 1951

2,556,606

UNITED STATES PATENT OFFICE 2,556,606

FLEXIBLE OIL ACID MODIFIED ALKYD RESIN WRINKLE COATING COMPOSITION AND METHOD OF MAKING

William A. Waldie, Oakwood, Ohio, assignor to New Wrinkle, Inc., Wilmington, Del., a corporation of Delaware No Drawing. Application March 12, 1946, Serial No. 653,934

4 Claims. (Cl. 260—22)

This invention relates to a coating composition which dries to a film of high flexibility and of a wrinkled surface texture and to a process for manufacturing same.

The composition of my invention, on account of its yielding a film of high flexibility, is excellently qualified for the coating of fabrics, leather, paper, rubber and of other flexible base materials.

Heretofore non-drying alkyd resin compositions were held incompatible with drying oils and also as yielding non-wrinkling coatings. However, against all expectations, it was found that by including fatty acid of a non-drying oil and drying oil in the alkyd resin formulation and reacting these ingredients under specific conditions, a composition is obtained which, when dried or baked, yields a coating of high flexibility and of a wrinkle texture.

Consequently the object of my invention is accomplished by reacting polyhydric alcohol and polybasic acid, fatty acid of a non-drying or semi-drying oil and drying oil at a temperature of from 425 to 525° F. and adding a metallic drier and a solvent to the mixture thus obtained.

Castor oil acids were found particularly suitable for the process and the product of my invention. However, other acids derived from non-drying or semi-drying oil may be used with equal satisfaction.

As the oil necessary, all drying oils were found applicable, conjugated double-bonded drying oils being preferable. Heat-treated linseed oil, oiticica oil, tung oil, dehydrated castor oil or a mixture of these oils were used with good results.

In order to prepare the composition of my invention I first react approximately 15 parts by weight of glycerin and from 15 to 40 parts by weight of phthalic anhydride at a temperature of from 375 to 425° F. and then add from 10 to 30 parts by weight of fatty acid to this reaction mixture. The mixture is then heated to a temperature of from 425 to 475° F. until a homogeneous product is obtained. Thereafter 15 to 30 parts by weight of drying oil are added and the batch heated to 475 to 525° F. until a clear homogenous liquid is obtained. The batch is then allowed to cool to a temperature sufficiently low to avoid evaporation of solvent when added. An oil-soluble metallic drier and solvent are then added.

Aromatic solvents, such as petroleum or coal tar solvents are suitable for the product of my invention. Alcohols, in particular butanol, are preferable because of their high dissolving power.

By using these stronger solvents, it is possible to obtain a more concentrated solution of the coating composition which is desirable in the case that the base material is to be coated by the doctor blade method.

Various oil-soluble metallic driers known to those skilled in the art are satisfactory for the product and process of my invention, the naphthenates, acetates or linoleates of cobalt, manganese or lead being preferable.

The amount of thinner is dependent upon the method by which the composition is to be applied onto the base material. It is understood that any method, such as spraying, rolling, dipping or doctor blading is applicable for the composition of my invention.

Drying of the coating composition, after application on the base material, is preferably carried out by baking, the temperature being dependent to a certain degree upon the base material, and in particular on its heat resistance. The higher the temperatures used for this baking step, the shorter the time required therefor. A baking temperature of 200° F. for one hour or a temperature of 150° F. for two hours, for instance, proved to be sufficient.

The flexibility and the wrinkle texture are dependent upon the quantity of oil added. The more oil, the more pronounced the wrinkle texture and the less flexible the coating obtained. A proportion of from 1 to 1.5 parts by weight of drying oil to 1 part by weight of fatty oil acid was found to be the optimal range.

In the following a few examples are given which demonstrate the composition and the process of my invention.

*Example I*

15 parts by weight glycerin
30 parts by weight phthalic anhydride
25.5 parts by weight castor oil acids
24 parts by weight liquid oiticica oil
20 parts by weight butanol
5 parts by weight cobalt linoleate 6%

The composition of this example was prepared by first heating the glycerin and phthalic anhydride to approximately 400° F., then adding the castor oil acids and heating the mixture to approximately 450° F. until the mixture was homogeneous; thereafter the oiticica oil was added and then this mixture heated to approximately 525° F. until a drop applied on a glass plate proved to be clear. The mixture thus obtained was then allowed to cool to 200° F., whereupon the butanol and cobalt linoleate were admixed.

This composition, after applying on a base material and baking, showed wrinkle texture and initial flexibility equal to that of known products and aging characteristics which showed this product still flexible after months of exposure to atmospheric conditions.

*Example II*

15 parts by weight glycerin
30 parts by weight phthalic anhydride
25.5 parts by weight castor oil acids
24 parts by weight raw tung oil
10 parts by weight butanol
5 parts by weight cobalt linoleate 6%

A film obtained with this composition, which was prepared according to the method described in Example I, showed an alligator-grained wrinkle texture of high flexibility.

*Example III*

15 parts by weight glycerin
30 parts by weight phthalic anhydride
25.5 parts by weight castor oil acids
24 parts by weight dehydrated castor oil
10 parts by weight butanol
5 parts by weight cobalt linoleate 6%

The texture of the film showed a very uniform wrinkle pattern and the coating proved to be highly flexible.

*Example IV*

15 parts by weight glycerin
30 parts by weight phthalic anhydride
25.5 parts by weight castor oil acids
24 parts by weight "prepared oil"
10 parts by weight butanol
5 parts by weight cobalt linoleate 6%

The process of manufacture was the same also in this case as that in Example I. The "prepared oil" was produced by heating equal parts by weight of dehydrated castor oil and raw tung oil to a temperature of approximately 600° F. until an oil of the viscosity Z resulted. Texture and flexibility of the baked composition were excellent in this instance.

It will be understood that other additional ingredients which are customary in the art may be incorporated into my composition. Thus, for example, pigments or dyes may be added to the product of my invention.

It will also be understood that while there have been described herein certain specific embodiments of my invention, it is not intended thereby to have it limited to or circumscribed by the specific details as to materials, proportions or conditions set forth, but that it is desired to comprehend such modifications as may come within the spirit of the disclosure and the scope of the appended claims.

I claim:

1. A method of preparing flexible wrinkle coating compositions comprising reacting approximately 15 parts by weight of glycerin and from 15 to 40 parts by weight of phthalic anhydride at a temperature of from 375 to 425° F., adding from 10 to 30 parts by weight of an acid selected from group of semi-drying and non-drying fatty oil acids, and heating to a temperature of from 425 to 475° F. until homogeneous, adding from 15 to 30 parts by weight of a drying oil and heating to a temperature of from 475 to 525° F. until homogeneous, cooling the batch to approximately 200° F., and finally adding an oil-soluble metallic drier and a solvent.

2. A flexible wrinkle coating composition comprising the reaction product of approximately 15 parts by weight of glycerin, from 15 to 40 parts by weight of phthalic anhydride, from 10 to 30 parts by weight of an acid selected from group of semi-drying and non-drying fatty oil acids, and from 15 to 30 parts by weight of drying oil; oil-soluble metallic drier; and solvent.

3. A method of preparing flexible wrinkle coating compositions comprising reacting approximately 15 parts by weight of glycerin and from 15 to 40 parts by weight of phthalic anhydride at a temperature of from 375 to 425° F., adding from 10 to 30 parts by weight of castor oil acids and heating to a temperature of from 425 to 475° F. until homogeneous, adding from 15 to 30 parts by weight of a drying oil and heating to a temperature of 475 to 525° F. until homogeneous, cooling the batch to approximately 200° F. and finally adding an oil-soluble metallic drier and a solvent.

4. A flexible wrinkle coating composition comprising the reaction product of approximately 15 parts by weight of glycerin, from 15 to 40 parts by weight of phthalic anhydride, from 10 to 30 parts by weight of castor oil acids and from 15 to 30 parts by weight of a drying oil; oil-soluble metallic drier; and solvent.

WILLIAM A. WALDIE.

REFERENCES CITED

The following references are of record in the file of this patent:

UNITED STATES PATENTS

| Number | Name | Date |
|---|---|---|
| 1,893,611 | Bradley | Jan. 10, 1933 |
| 1,893,873 | Kienle | Jan. 10, 1933 |
| 2,121,334 | Barsky | June 21, 1938 |
| 2,461,564 | Moore | Feb. 15, 1949 |